MAGNETIC DEVICE

Filed Nov. 17, 1953

INVENTOR
SHOU-HSIEN CHOW
BY
Donald W. Phillion
ATTORNEY 2,762,935
Patented Sept. 11, 1956

2,762,935

MAGNETIC DEVICE

Shou-Hsien Chow, Philadelphia, Pa., assignor to Burroughs Corporation, Detroit, Mich., a corporation of Michigan Application November 17, 1953, Serial No. 392,579
7 Claims. (Cl. 307—88)

This invention relates generally to binary counters and more particularly to binary counters utilizing saturable reactors having substantially square hysteresis loop characteristics.

There are many different types of binary counters in the prior art including electronic, mechanical, and magnetic binary counters. These various types of counters find considerable usage in computing apparatus. The magnetic type binary counters possess the characteristics of rapid operation and permanency of operating characteristics. The present invention is a type of magnetic binary counter.

One object of the present invention is to provide an improved binary counter utilizing magnetic cores.

Another object of the invention is to provide a binary counter in which the operating characteristics do not change appreciably with age or use.

Another object of the invention is to provide a binary counter in which information is capable of being maintained without the necessity of having a constant power supply.

A further object of the invention is the improvement of binary counters generally.

In accordance with one embodiment of the invention there is provided a first magnetic core and a second magnetic core inductively coupled together by means which includes an asymmetrical device so that current can flow in one direction only in the coupling means. Each magnetic core has an input winding wound thereon. The two input windings are connected in series arrangement to an input pulse source. The impedances of the two windings are such that an input pulse from said input pulse source flowing through said two input windings will cause only said second magnetic core to switch magnetic flux remanence polarity when both of said cores have a remanence condition of a polarity that would be reversed by input pulse if the input pulse were of sufficient strength. The first magnetic core has an additional winding thereon which is energized by a power pulse source to cause the first magnetic core to assume a remanence polarity opposite that caused by energization of the input winding associated therewith. The second core has an output winding wound thereon with means adapted to permit current to flow therethrough in one direction only.

These and other objects, advantages, and features of the invention will be more fully understood from the following detailed description when read in conjunction with the drawings in which.

Figure 1:
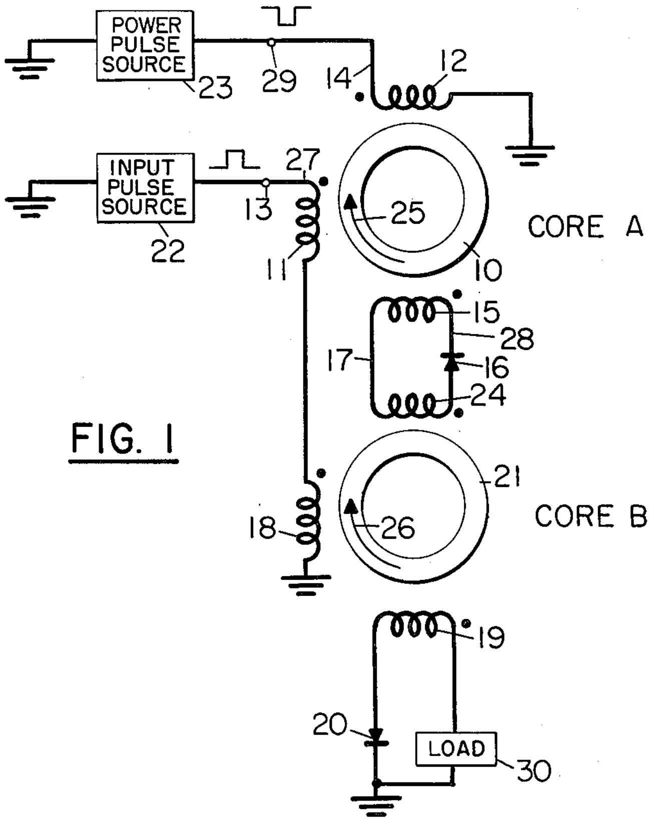
Fig. 1 shows a schematic sketch of the invention.

Referring now to Fig. 1 the closed magnetic cores or loops 10 and 21 provide the storage means for information fed into the system. Each of the cores 10 and 21 can be caused to assume a positive remanence or a negative remanence. One of the remanence polarities can be arbitrarily designated as representing a binary bit of "1" and the other polarity can be arbitrarily designated as representing a binary bit of "0." An input pulse source 22 furnishes input pulses to the input winding 11 which is wound on magnetic core 10 and to the input winding 18 which is connected in series with winding 11 and which is wound on magnetic core 21. A power pulse source 23 furnishes current pulses to a winding 12 which is wound on magnetic core 10. Output winding 15 which is wound on core 10 is coupled to winding 24, which is wound on core 21, through an asymmetrical device 16. Output winding 19 is wound on core 21 and is connected in series with an asymmetrical device 20 and load 30. The asymmetrical device 20 performs the function of permitting a current flow through the load 30 of one polarity only.

It is to be noted that when the impedance of winding 18 is sufficiently greater than the impedance of winding 11 and if the magnetic flux of both the magnetic cores 10 and 21 is of such a polarity that would ordinarily be switched to the opposite polarity by an input pulse transmitted from input pulse source 22, if said input pulse were of sufficient strength, only the magnetic flux of the magnetic core 21 will be caused to switch from one polarity to the other polarity. The coupling circuit between cores 10 and 21 consisting of windings 15 and 24 and asymmetrical device 16 is arranged so that when a pulse is applied to the winding 12 from power pulse source 23 and the magnetic flux of core 10 is switched thereby, the magnetic flux of core 21 will also be switched by current flowing in the coupling circuit and an output voltage will be generated in output winding 19 of such a polarity as to cause a current to pass through the low forward impedance of asymmetrical device 20.

In one preferred embodiment of the invention the following values can be used. Each of the cores 10 and 21 has a mean diameter of 0.375 inch, a width of 0.002 inch, a thickness of 0.125 inch, and is composed of a magnetic material having a square hysteresis loop such as one of the ferrites. A product well known in the art as Deltamax has been found to be well adapted for the purposes of this invention. Input winding 11 has 150 turns, input winding 18 has 350 turns, winding 12 has 300 turns, output winding 15 has 450 turns, winding 24 has 350 turns, and output winding 19 has 150 turns. The load 30 can be any suitable load desired.

It is to be noted that various changes can be made in the size and shape of the magnetic cores 10 and 21 and the number of turns of the various windings. The magnetic cores 10 and 21 may be different in size and shape and the number of turns in the input windings 11 and 18 and the other windings may be changed. The important criterion with respect to the windings 11 and 18 is that their impedances be such that only one magnetic core will switch from one polarity to the other polarity when an input pulse is transmitted from source 22 at a time when such a pulse will tend to cause both cores 10 and 21 to switch polarities.

Figure 2:
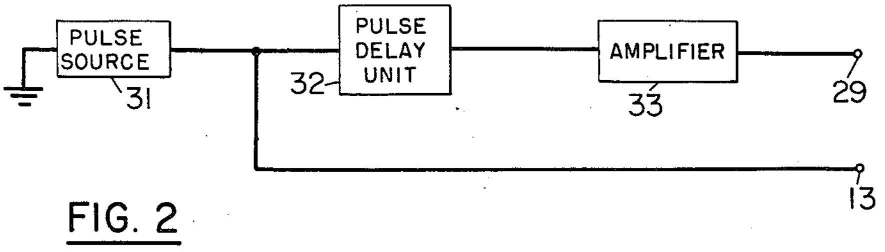
Fig. 2 shows an alternative energizing source means.

Referring now to Fig. 2 there is shown a circuit means determinative of the time relationship between the power pulse source and the input pulse source. This circuit shown in Fig. 2 is adapted to be connected to the terminals 29 and 13 of Fig. 1 in place of the power pulse source 23 and the input pulse source 22 of Fig. 1. In Fig. 2 the output of pulse source 31 which corresponds to the input pulse source of Fig. 1 is connected directly to terminal 13, and to terminal 29 through the pulse delay unit 32 and the amplifier 33. An input pulse transmitted from pulse source 31 will flow directly through the input windings 11 and 18. Additionally, the pulse transmitted from the pulse source 31 will flow through the pulse delay unit 32, the amplifier 33, and then through the winding 12 of Fig. 1. Due to the pulse delay unit 32 the current pulse through the winding 12 will occur after the current pulse through the input wndings 11 and 18. It is to be noted that there must be at least one power pulse after every input pulse. This is in accordance with the theory of operation of the device described later herein.

The arrow 25 represents the direction of the magnetic flux when the core is in a condition of what herein is arbitrarily defined as a positive remanence. Further, positive remanence is herein defined as representing a binary bit of "1" and negative remanence is herein defined as representing a binary bit of "0." The windings 11 and 18 are wound on the cores 10 and 21 in such a manner that the cores 10 and 11 will be driven towards positive saturation when a positive input pulse is generated by input pulse source 22.

The dots appearing adjacent each of the windings 11, 12, 15, 18, 24, and 19 have the following meaning. A current entering a winding terminal nearest the dot notation associated with that particular winding will cause an induced current to flow out of the terminal nearest the dot notation associated with a second given winding wound on the same magnetic core. For example, a positive input pulse applied to the terminal 27 of winding 11 would, in the absence of asymmetrical device 16, cause a positive current to flow out of the terminal 28 of winding 15, assuming that a change of magnetic flux occurred in the magnetic core 10.

The operation of the circuit will now be described in detail. Assume that both of the magnetic cores 10 and 21 are in a condition of negative remanence. If then a positive input pulse of about 10 volts amplitude and 15 microseconds duration from input pulse source 22 is caused to flow through the windings 11 and 18, core 21 will be caused to be switched from a condition of negative remanence to a condition of positive saturation and upon cessation of the pulse relax to a condition of positive remanence. The magnetic core 10 will not be switched however because of the ratio of the number of turns of windings 11 and 18. If then a positive power pulse of about 25 milliamperes amplitude and 30 microseconds duration is then transmitted from source 23 through the winding 12 the core 10 will be caused to assume a condition of negative saturation and will return to a condition of negative remanence upon cessation of the power pulse thus effecting no appreciable change in condition. Since the winding 18 now offers only a relatively small impedance to an input pulse due to the fact that core 21 is in a positive remanent condition, the next positive input pulse from source 22 will switch only core 10 to a positive remanence. The next negative power pulse will cause core 10 to be switched from a condition of positive remanence to a condition of negative saturation and then to a condition of negative remanence after the cessation of the said power pulse. Switching of core 10 from a condition of positive remanence to a condition of negative saturation will cause a voltage to be induced in winding 15 which will cause a positive current flow through the low forward impedance of asymmetrical device 16 and through winding 24. This current flow through the winding 24 is sufficient to cause the magnetic core 21 to switch from a condition of positive remanence to a condition of negative remanence. Consequently, this second applied power pulse will cause both cores 10 and 21 to return to the initial condition of negative remanence, thus completing the cycle of operation. It is to be noted that the asymmetrical device 20 is so connected that when an input pulse applied to winding 18 causes the core 21 to switch magnetic flux polarities from negative to positive, no current will flow in the winding 19. If desired, the output of the core 21 can be utilized to operate another binary counter stage.

It is to be noted that the forms of the invention herein shown and described are but preferred embodiments of the same and that various changes may be made in shapes, sizes, materials, circuit constants, and circuit arrangement without departing from the spirit or scope of the invention.

What is claimed is:

1. A magnetic device comprising a first loop of magnetic material, a second loop of magnetic material, a first input winding wound on said first loop, a second winding wound on said first loop, a third winding wound on said first loop, a fourth input winding wound on said second loop, a fifth winding wound on said second loop, a sixth winding wound on said second loop, said first input winding and said fourth input winding being connected in series arrangement, and said third winding and said fifth winding being connected in series arrangement, a first current pulse source adapted to energize the series arrangement of said first input winding and said fourth input winding, and a second current pulse source adapted to energize the said second winding, said second current pulse source being adapted to generate at least one pulse after every pulse generated by said first current pulse source.

2. A magnetic device in accordance with claim 1 comprising an asymmetrical device connected in series with said third winding and said fifth winding.

3. A magnetic device in accordance with claim 1 comprising a first asymmetrical device connected in series with said third winding and said fifth winding and a second asymmetrical device connected in series with said sixth winding.

4. A magnetic device comprising two cores of magnetic material, an input winding on each of said cores coupled in series, means including a pulse source coupled to the series input windings to tend to establish magnetic remanence of the same polarity in each core, a further pulse source providing pulses at a time later than pulses from the first said source, a further winding on a first of the cores coupled to establish magnetic remanence of a polarity opposite said polarity in the first core in response to pulses from the further pulse source, means for preventing the said first of the cores from switching in response to pulses from the first said pulse source when the second core is unswitched, a transfer circuit coupling the cores together to cause the second said core to switch from the said polarity to the opposite polarity in response to switching of the first said core in response to the pulses from said further pulse source, and an output circuit coupled to the second core responsive only to switching from the said polarity to the opposite polarity, whereby two input pulses are required to produce one output pulse.

5. A binary counter comprising in combination, a pair of magnetic cores, a pulse source, a circuit coupled to said pulse source tending to switch both said cores simultaneously to the same first polarity, a circuit for causing only one of said cores to switch at a time in response to pulses from said source, a further pulse source connected to supply pulses corresponding to the pulses from the first said pulse source but arriving thereafter, a circuit coupled to a first of the cores and the further pulse source to switch said core to the polarity opposite said first polarity, a transfer circuit coupling said cores to cause the second of the cores to switch to a polarity opposite the said first polarity in response to the switching of the first of the cores in response to pulses from the said further pulse source, and an output circuit coupled to the second of the cores responsive to switching of that core from one polarity to the other.

6. In a magnetic device, two cores of magnetic material each characterized by being capable of switching to magnetic remanence conditions of either a positive or a negative polarity, an input winding inductively coupled to each of said cores and connected to each other in series, one of said input windings having a substantially greater number of turns than the number of turns of the other input winding, a pulse source connected in series with said input windings in such polarity to tend to switch both cores to the same reference remanence condition, the power of the pulses supplied from said source being so related to the respective impedances of the two input windings that when the two cores are both of the same magnetic polarity each pulse will switch only the core having the winding with the larger number of turns leaving the other core unswitched, but when the two cores are of opposite magnetic polarity with the core having the input winding with the lesser number of turns in a remanence condition opposite said reference remanence condition each pulse will switch the core having the input winding with the lesser number of turns leaving the other core unswitched.

7. In a magnetic device, a first core and a second core of magnetic material each characterized by being capable of switching to magnetic remanence conditions of either a positive or a negative polarity, an input winding inductively coupled to the first core, an input winding inductively coupled to the second core and having a substantially greater number of turns than the number of turns of the input winding of the first core, a pulse source connected in series with said input windings, the power of the pulses supplied from said source being so related to the respective impedances of the two input windings that when the two cores are both of the same magnetic polarity a pulse from the source will switch only the second core leaving the first core unswitched, but when the two cores are of opposite magnetic polarity the reduced impedance presented by the winding of the second core will enable a pulse from the source to switch the first core, an additional input winding inductively coupled to the first core, a second pulse source connected to said additional winding and supplying pulses of sufficient power to switch the remanence polarity of the first core to opposite that caused by the energization of the input winding associated therewith, and a transfer circuit inductively coupling the cores together to cause the second core to switch in response to the switching of the first core.

References Cited in the file of this patent

UNITED STATES PATENTS

| | | |
|---|---|---|
| 2,654,080 | Brown | Sept. 29, 1953 |
| 2,666,151 | Rajchman et al. | Jan. 12, 1954 |
| 2,680,819 | Booth | June 8, 1954 |